T. M. Hill,
Cage Trap.

№ 83,633.      Patented Nov. 3, 1868.

Witnesses:      Inventor:

H. H. Sonnuksen      Thomas M. Hill

Wm F. Dennis

United States Patent Office.

THOMAS M. HILL, OF RICHMOND, INDIANA.

Letters Patent No. 83,633, dated November 3, 1868.

IMPROVED ANIMAL-TRAP.

The Schedule referred to in these Letters Patent and making part of the same.

*To whom it may concern:*

Be it known that I, THOMAS M. HILL, of Richmond, Indiana, have invented certain new and useful Improvements in Animal-Traps; and I do hereby declare the following to be a full, clear, and exact description of the same, reference being had to the drawings which accompany this specification, forming a part thereof, and to the letters of reference marked thereon.

My invention consists in a rectilinear box or case, open at the ends, one of which is provided with a gate or door, working in upright parallel guides. The gate or door is operated upward by arms, which form a portion of a rocking platform inside the box or case of the trap.

To enable those skilled in the art to use and construct my said invention, I will proceed to describe the same.

Figure 1:
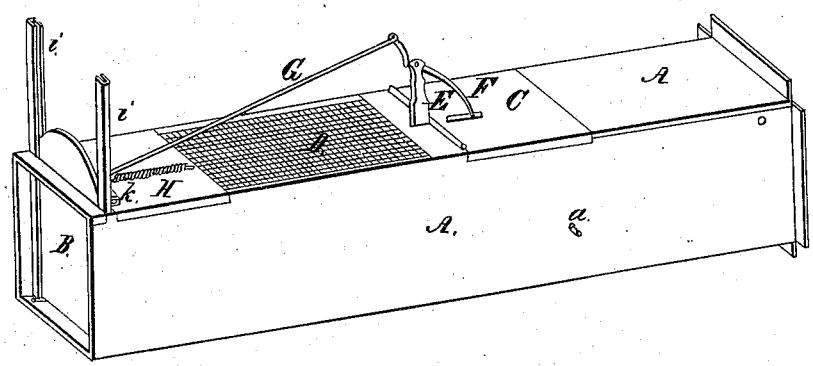
Figure 1 is a perspective view of my trap.
Figure 2:
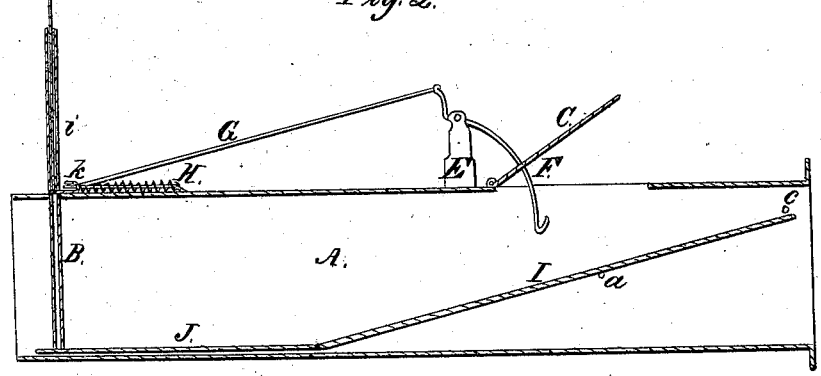
Figure 2 is a vertical sectional view of the same.

A, fig. 1, represents the box or case;

B is the door or gate; and

*i i* the guide-ways, in which the door works up and down.

E is a post, attached centrally to the top of the box A, at the top of which is pivoted the trigger F, the lower end of which terminates in a hook, to which the bait may be secured.

Attached to the upper end of the trigger F is a connecting-rod, G, at the opposite end of which it is connected with a head-block, K, which is held in position by a spiral spring, H.

The head-block, K, is provided with a pin, which projects below the bottom of the gate when the same is raised, and holds it in its raised position.

A vertical pressure upon the hook of the trigger F withdraws this head-block, and the gate drops in the guides by its own weight.

C is a hinged lid, immediately in the rear of the post E, on the top of the box, to facilitate baiting the trap.

D is a section of wire gauze, inserted in the top of the box, near the forward end, to admit light.

The vibrating platform I is hung, by the shaft, *a*, in the interior of the box.

The levers J are a continuation of the side rails of the platform, and are extended forward sufficiently to receive the bottom edge of the gate B.

As the rear end of the platform I is pressed down, the levers J are elevated, carrying the door B to a sufficient height to allow the pin in the head-block, operated by the spring, to move forward and secure the door, thus setting the trap. The animal, by seizing the bait, withdraws the pin supporting the door, which, by its fall, secures the victim, which, on its passage over the rear end of the platform, depressed it in its exit, thus resetting the trap. Any convenient receptacle may be provided for the captured animals.

Having thus fully described my said invention,

What I claim as new, and desire to secure by Letters Patent, is—

The arrangement and combination of the vibrating platform I with its levers J J, the door B working in guides *i i*, the head-block K, spring H, connecting-rod G, post E, and trigger F, with the box A, when provided with the hinged lid C and opening D, for the purpose and in the manner substantially as herein set forth and described.

THOMAS M. HILL.

Witnesses:
H. H. SONNIKSEN,
WM. T. DENNIS.